United States Patent
Okada et al.

(10) Patent No.: US 8,646,296 B2
(45) Date of Patent: Feb. 11, 2014

(54) STEERING LOCKING DEVICE

(75) Inventors: Takahiro Okada, Kanagawa-Ken (JP);
Takeshi Sakano, Aichi-Ken (JP);
Kenjirou Hayashi, Kanagawa-Ken (JP)

(73) Assignees: Alpha Corporation, Yokohama (JP);
Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/517,931

(22) PCT Filed: Dec. 22, 2010

(86) PCT No.: PCT/JP2010/073204
§ 371 (c)(1),
(2), (4) Date: Jun. 20, 2012

(87) PCT Pub. No.: WO2011/078260
PCT Pub. Date: Jun. 30, 2011

(65) Prior Publication Data
US 2012/0260701 A1    Oct. 18, 2012

(30) Foreign Application Priority Data
Dec. 24, 2009  (JP) ................... P2009-292657

(51) Int. Cl.
*B60R 25/02* (2013.01)
(52) U.S. Cl.
USPC .............................................. 70/186; 70/252
(58) Field of Classification Search
USPC .......................................... 70/181–186, 252
See application file for complete search history.

(56) References Cited

U.S. PATENT DOCUMENTS

| | | | | |
|---|---|---|---|---|
| 6,233,986 B1 * | 5/2001 | Suzuki et al. | | 70/186 |
| 6,439,011 B1 * | 8/2002 | Frick et al. | | 70/185 |
| 6,516,640 B2 * | 2/2003 | Jacobs et al. | | 70/186 |
| 6,539,756 B2 * | 4/2003 | Bartels et al. | | 70/186 |
| 7,251,968 B2 * | 8/2007 | Hasegawa | | 70/186 |
| 8,240,176 B2 * | 8/2012 | Okada | | 70/182 |
| 2009/0084145 A1 * | 4/2009 | Sugimoto | | 70/186 |
| 2009/0139284 A1 * | 6/2009 | Sugimoto | | 70/186 |
| 2009/0266122 A1 * | 10/2009 | Okada et al. | | 70/252 |

FOREIGN PATENT DOCUMENTS

| | | |
|---|---|---|
| CN | 101445093 A | 6/2009 |
| DE | 102008037791 A1 | 3/2009 |
| EP | 0953487 A1 | 11/1999 |
| EP | 1410963 A1 | 4/2004 |
| EP | 2090477 A1 | 8/2009 |
| GB | 2257676 A | 1/1993 |
| JP | 10138870 A | 5/1998 |
| JP | 2004114730 A | 4/2004 |
| JP | 2009046096 A | 3/2009 |
| WO | 2008050664 A1 | 5/2008 |

OTHER PUBLICATIONS

EPO Search Report dated May 22, 2013.
Official Action issued in Japanese Patent Application No. 2009-292657 dated Oct. 22, 2013, 2 pages.
Official Action issued on Dec. 4, 2013 in the counterpart Chinese application.

* cited by examiner

*Primary Examiner* — Christopher Boswell
(74) *Attorney, Agent, or Firm* — Nath, Golberg & Meyer; Jerald L. Meyer

(57) ABSTRACT

A steering locking device (1, 1A, 1B, 1C) includes: a locking member (6) including a first face (B) parallel to an axial direction of a steering shaft, a second face (C) perpendicular to the first face (B), and a protrusion (62) protruding from the second face (B); and a sliding plate (91) extending from the first face (B) in a plate thickness direction (D) of the locking member (6), arranged outside the first face (B), and engageable with the protrusion (62).

6 Claims, 13 Drawing Sheets

STEERING LOCKING DEVICE

TECHNICAL FIELD

The present invention relates to a steering locking device configured to lock rotation of a steering shaft of an automobile.

BACKGROUND ART

Patent Document 1 discloses a steering locking device of the related art. As shown in FIGS. 1 and 2, a steering locking device 100 includes a locking member 102, a driving body 103, and an auxiliary locking member 104. The locking member 102 is urged by a coil spring 101 in a direction to an unillustrated steering shaft of an automobile (an upward direction in FIGS. 1 and 2), and is fittable to the steering shaft. The driving body 103 is configured to drive the locking member 102. The auxiliary locking member 104 is arranged near the locking member 102 and capable of locking the locking member 102 at a locked position. The driving body 103 includes a rotating member 106 and a cam member 107. The rotating member 106 is configured to be driven by a motor 105 via an unillustrated worm. The cam member 107 is configured to be reciprocated in moving directions of the locking member 102 by the rotation of the rotating member 106. The cam member 107 is coupled to the locking member 102 with a coupling pin 108.

The auxiliary locking member 104 has an engagement protrusion 110 engageable with an engagement groove 109 in a side portion of the locking member 102 and is urged in a direction to the locking member 102 by a spring member 111. A holding portion 113 is provided extending from a back surface of a housing cover 112 to the auxiliary locking member 104 in the moving direction of the locking member 102. A front end of the holding portion 113 is engaged with an engagement groove portion 114 of the auxiliary locking member 104, and thereby the auxiliary locking member 104 is kept separated away from the locking member 102.

In the aforementioned configuration, when the motor 105 is rotated in a locking direction while the automobile is parked, a driving force of the motor 105 rotates the rotating member 106 to move the cam member 107 in the locking direction (the upward direction in FIG. 1) of the locking member 102, and thus the urging force of the coil spring 101 displaces the locking member 102 to the locked position. As the result, a front end of the locking member 102 is fitted to the steering shaft, and rotation of the steering shaft is prevented. Thus, the automobile becomes unsteerable.

Thereafter, when the motor 105 is rotated in an unlocking direction, the rotating member 106 is rotated in a reverse direction, and the locking member 102 together with the cam member 107 is displaced to an unlocked position. As the result, the locking member 102 is released from the steering shaft, and the steering shaft is allowed to rotate freely. Thus, the automobile becomes steerable.

In the locked state shown in FIG. 1, the holding portion 113 protrudes from the back surface of the housing cover 112 toward the auxiliary locking member 104, and the front end of the holding portion 113 is engaged with the engagement groove portion 114 of the auxiliary locking member 104. Thereby, the auxiliary locking member 104 is kept separated away from the locking member 102. After that, as shown in FIG. 2, when the housing cover 112 is removed while the vehicle is parked, the holding portion 113 is disengaged from the engagement groove portion 114 of the auxiliary locking member 104, and thus the auxiliary locking member 104 is urged in the direction to the locking member 102 by the spring member 111, so that the engagement protrusion 110 is engaged with the engagement groove 109 in the side portion of the locking member 102. This causes the locking member 102 to be kept at the locked position, thus preventing the rotation of the steering shaft. It is possible to prevent a problem that the vehicle is made steerable by an unauthorized unlocking operation and thus to enhance vehicle theft prevention at the time of parking of the vehicle.

CITATION LIST

Patent Literature

PTL 1: Japanese Unexamined Patent Application Publication No. 2009-46096

SUMMARY OF INVENTION

However, since the engagement groove 109 is provided in the side portion of the locking member 102 in the steering locking device 100, the rigidity of the locking member 102 is deteriorated. Thus, the locking member 102 requires a large size, and components are difficult to arrange in a limited space. In addition, since the auxiliary locking member 104 is likely to be arranged at a position easily allowing an act of the unauthorized unlocking operation, the configuration thereof has a theft prevention problem. Thus, a protection wall covering the auxiliary locking member 104 needs to be provided by using a rigid frame or the like. Moreover, in assembling the steering locking device 100, after the auxiliary locking member 104 is arranged in a step of attaching the auxiliary locking member 104 to the steering locking device 100, the auxiliary locking member 104 needs to be locked into the holding portion 113 while being moved backward to an initial position. Cumbersome work is required.

An object of the present invention is to provide a steering locking device which has excellent theft prevention making difficult unlocking a steering shaft in an unauthorized action and which has excellent assembling workability while ensuring the rigidity of the locking member.

A first aspect of the present invention is a steering locking device including: a locking member arranged in a housing to be slidable between a locked position and an unlocked position, the locking member at the locked position being engaged with a steering shaft to prevent rotation of the steering shaft and at the unlocked position being separated away from the steering shaft to allow the rotation of the steering shaft, the locking member including a first face parallel to an axial direction of the steering shaft, a second face perpendicular to the first face, and a protrusion protruding from the second face; a sliding plate held to be slidable between an engaged position and a disengaged position and urged toward the engaged position, the sliding plate at the engaged position being engaged with the protrusion of the locking member located at the locked position and at the disengaged position being separated away from the protrusion to allow sliding of the locking member; and a holding portion arranged to be attachable to and detachable from the housing, the holding portion attached to the housing being configured to engage with the sliding plate located at the disengaged position to hold the sliding plate at the disengaged position. When the holding portion and the sliding plate are disengaged from each other, the sliding plate is moved from the disengaged position to the engaged position and engaged with the protrusion to prevent movement of the locking member from the locked position to the unlocked position.

According to the first aspect, the protrusion with which the sliding plate is engaged is provided to the locking member, instead of an engagement groove in the locking member as in the related steering locking device. Thus, it is possible to make the locking member compact while ensuring the rigidity of the locking member, and it is relatively easy to arrange components in a limited space. The sliding plate engaged with the protrusion extends from the wide face of the locking member in a plate thickness direction of the locking member, and an auxiliary locking member including the sliding plate is arranged outside the wide first face of the locking member. Thus, it is possible to set the position of the auxiliary locking member at a position at which there exists no space allowing an act of an unauthorized unlocking operation, for example, at a position on the front side of a vehicle and thus to reduce possibility of suffering from the act of the authorized unlocking operation. Further, since the auxiliary locking member is provided with the sliding plate, an auxiliary lock accommodating hole in the housing which accommodates the auxiliary locking member can be made small, and influence of the unauthorized unlocking operation on the housing can be reduced. Accordingly, it is possible to prevent a problem that the vehicle becomes steerable due to the unauthorized unlocking operation at the time of parking of the vehicle and possible to enhance vehicle theft prevention at the time of parking of the vehicle.

The locking member may include a hanger located on a proximal end side of the locking member, a lock main body located on a distal end side of the locking member and engageable with the steering shaft, a coupling pin configured to couple the hanger and the lock main body, and an urging unit provided between the hanger and the lock main body and configured to urge the lock main body from a side of the unlocked position to a side of the locked position. The protrusion may be part of the coupling pin.

The configuration provides the following effects in addition to the aforementioned ones. The protrusion with which the sliding plate is engaged is formed by the coupling pin which connects the hanger and the lock main body, and thereby the protrusion eliminates the need to specially provide another component or another portion.

The locking member may include a hanger located on a proximal end side of the locking member, a lock main body which is located on a distal end side of the locking member and a front end of which is fittable in the steering shaft, and an urging unit provided between the hanger and the lock main body and configured to urge the lock main body from a side of the unlocked position to a side of the locked position. The hanger may include an arm portion extending along the second face of the locking member. The arm portion may include the protrusion.

The configuration provides the following effects in addition to the aforementioned ones. The protrusion with which the sliding plate is engaged protrudes from the arm portion of the hanger. Thus, the length of the protrusion can be limited to reduce a bending force acting on the protrusion, and thus the durability of the protrusion can be enhanced. Accordingly, the influence of the unauthorized unlocking operation performed on the locking member including the protrusion can be reduced, and thus enhancement of the theft prevention can be achieved.

A second aspect of the present invention is a steering locking device including: a locking member arranged in a lock accommodating hole formed in a housing to be slidable between a locked position and an unlocked position, the locking member at the locked position being engaged with a steering shaft to prevent rotation of the steering shaft and at the unlocked position being separated away from the steering shaft to allow the rotation of the steering shaft; a sliding plate held in an auxiliary lock accommodating hole formed in the housing to be slidable between an engaged position and a disengaged position and urged toward the engaged position, the sliding plate at the engaged position being engaged with the locking member located at the locked position and at the disengaged position being separated away from the locking member to allow sliding of the locking member; a closure member including a jig groove formed in a direction of attaching the closure member into the auxiliary lock accommodating hole, an elastic first arm portion, and a claw formed on a front end of the first arm portion, the closure member configured to close the auxiliary lock accommodating hole with the sliding plate arranged in the auxiliary lock accommodating hole; and a holding portion arranged to be attachable to and detachable from the housing, the holding portion attached to the housing being configured to engage with the sliding plate located at the disengaged position to hold the sliding plate at the disengaged position. In a state where an assembling jig including an elastic second arm portion and a temporary locking protrusion provided on an inner surface of an end portion of the second arm portion is attached to the closure member, the second arm portion is arranged in the jig groove and the temporary locking protrusion is engaged with the sliding plate to hold the sliding plate on a side of the disengaged position on the closure member. The sliding plate and the closure member together with the assembling jig are arrangeable in the auxiliary lock accommodating hole. The temporary locking protrusion and the sliding plate are disengaged from each other by pulling out the assembling jig arranged in the auxiliary lock accommodating hole with the holding portion attached to the housing, and the sliding plate comes into contact and engagement with the holding portion and is held at the disengaged position in the auxiliary lock accommodating hole.

According to the second aspect, an auxiliary lock assembly body constituted of the sliding plate and the closure member is assembled by using the assembling jig. In this assembled state, the auxiliary locking member is arranged in the auxiliary lock accommodating hole, the cover is attached to the housing, and then the assembling jig is pulled out. This enables the auxiliary locking member to be placed in the auxiliary lock accommodating hole while the sliding plate is held on the disengaged position side. Thereby, the auxiliary locking member and the cover can be attached to the housing without the need for such a cumbersome step as moving the sliding plate to the disengaged position side in attaching the cover to the housing.

DESCRIPTION OF EMBODIMENTS

Figure 1:
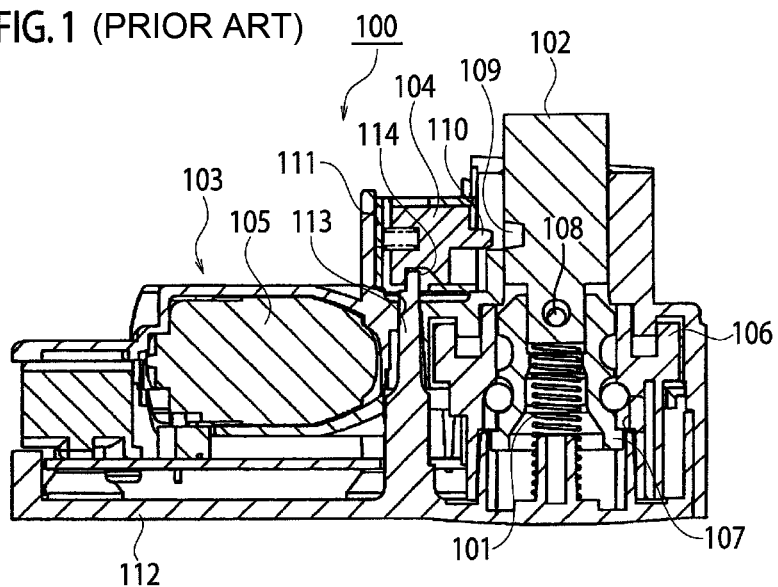
FIG. 1 is a cross-sectional view showing a locked state of a steering locking device related to the present invention.
Figure 2:
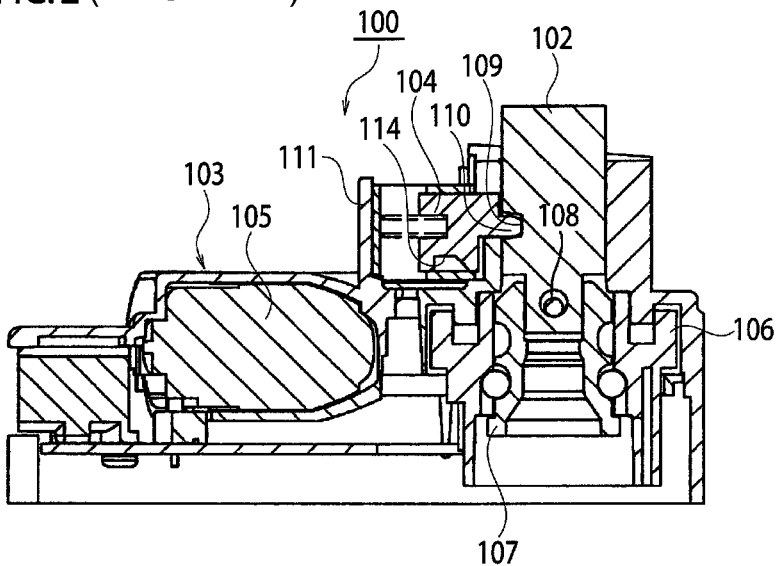
FIG. 2 is a cross-sectional view showing a state in which a cover is removed from a housing of the steering locking device in FIG. 1.
Figure 3:
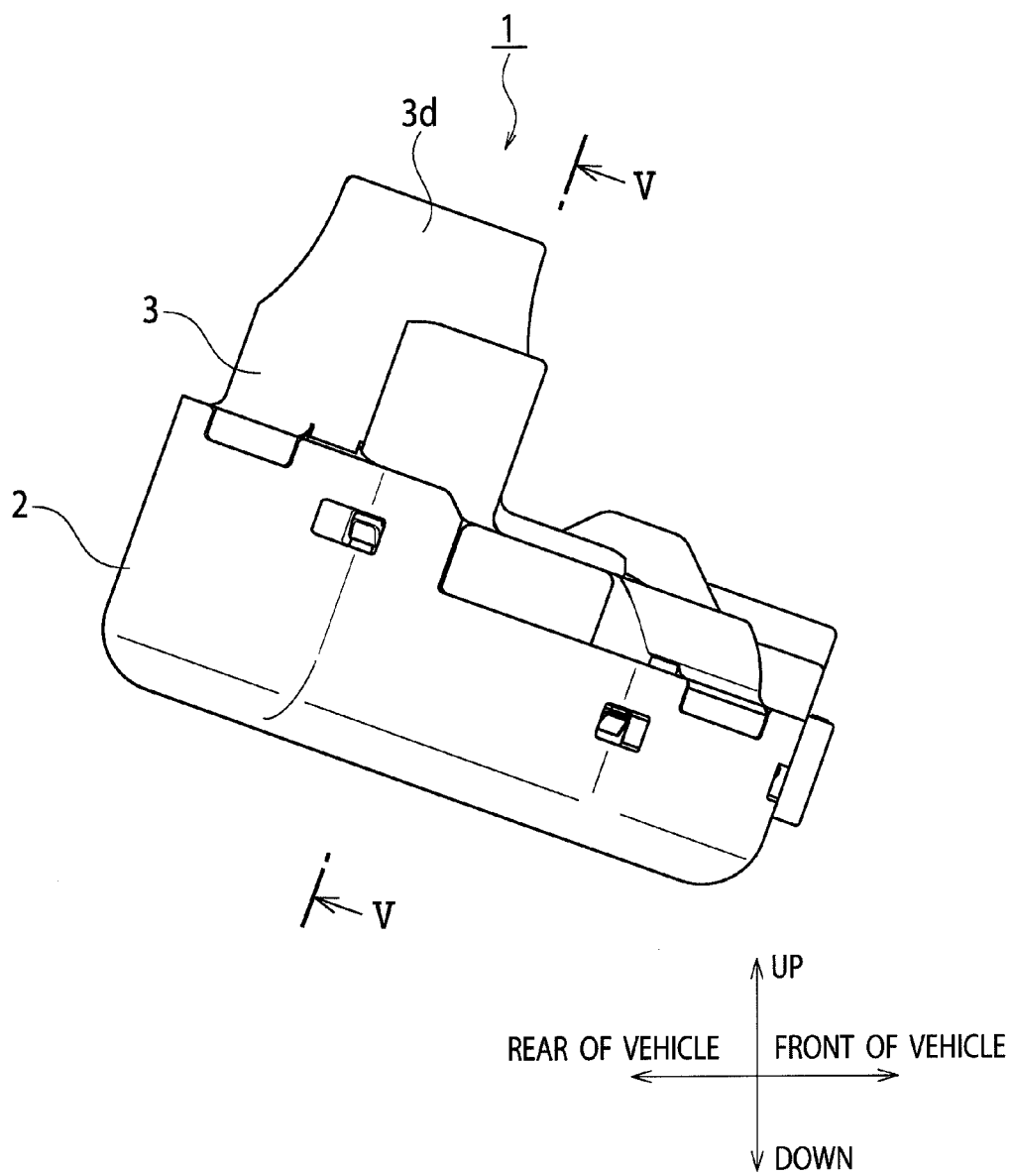
FIG. 3 is a side view showing a locked state of a steering locking device according to First Embodiment of the present invention.
Figure 4:
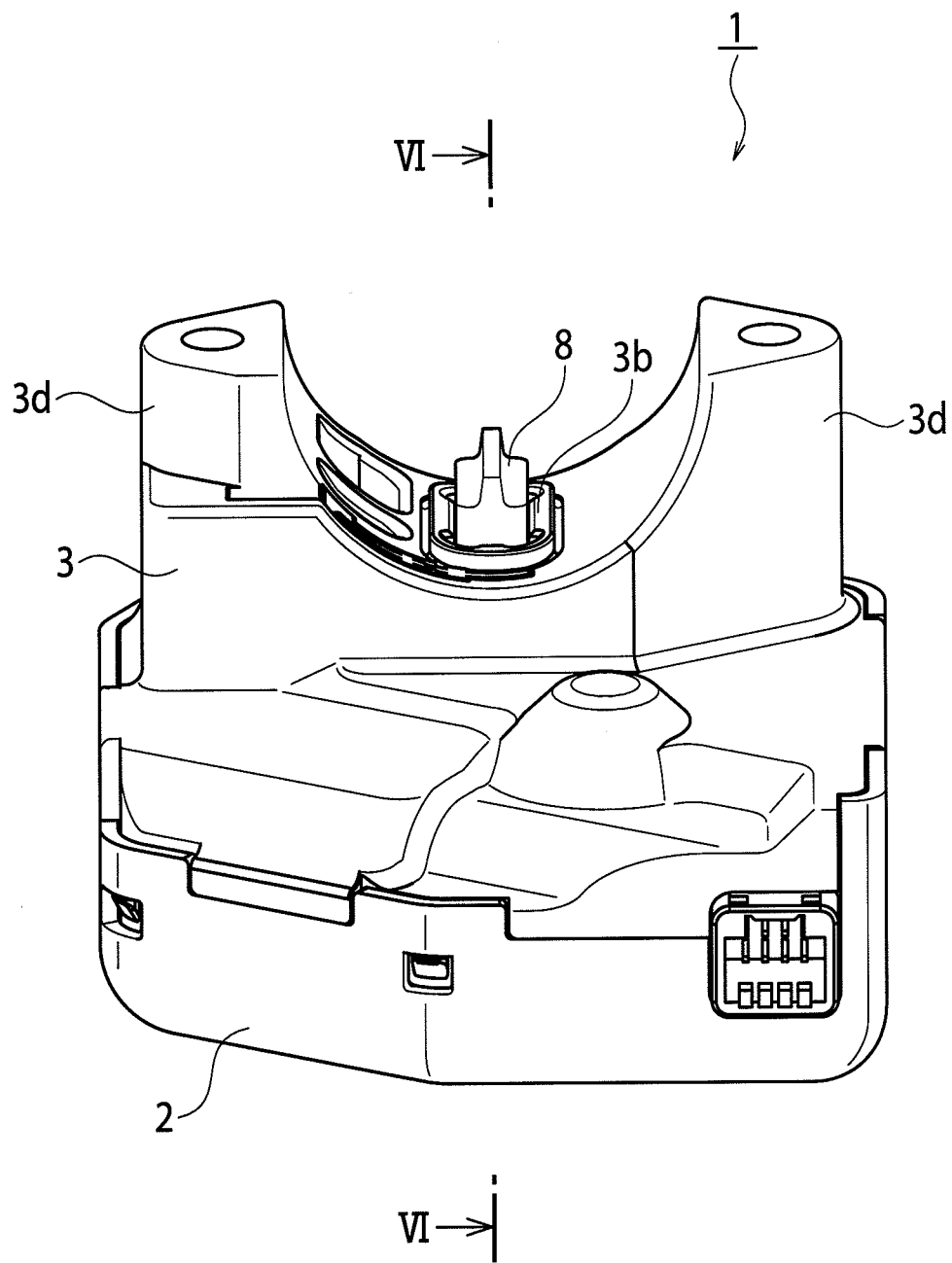
FIG. 4 is a front view showing the locked state of the steering locking device according to First Embodiment of the present invention.

An embodiment of the present invention will be described below in detail based on the drawings.

First Embodiment

As shown in FIGS. 3 to 12, a steering locking device 1 of First Embodiment includes a cover 2 and a housing 3 which are attached to each other and is attached to a steering column device A accommodating an unillustrated steering shaft of an automobile.

The housing 3 includes a component accommodating chamber 3a, a lock accommodating hole 3b, and an auxiliary lock accommodating hole 3c which are formed inside the housing 3, and has a pair of leg portions 3d, 3d. The component accommodating chamber 3a is opened toward one side of the steering locking device 1 (a lower side in FIGS. 5, 6, and the like). The lock accommodating hole 3b penetrates the housing 3 from a bottom portion of the component accommodating chamber 3a to the steering column device A side and extends in a vertical direction with respect to an axial direction of the steering shaft. The auxiliary lock accommodating hole 3c extends in a direction orthogonal to the lock accommodating hole 3b. The pair of legs 3d, 3d are arranged in such a manner as to stride over the steering column device A. The component accommodating chamber 3a accommodates a motor (not shown) which is a driving source, a worm wheel 4, and a sliding member 5. The worm wheel 4 is rotated in the unlocking direction and the locking direction by driving a worm gear 41 of a revolving shaft of the motor. The sliding member 5 is driven with the worm wheel 4 placed in between and is slid in a vertical direction with respect to a lock main body 8 to be described later. The lock accommodating hole 3b accommodates a locking member 6 for keeping the locked state of the steering shaft. The auxiliary lock accommodating hole 3c accommodates an auxiliary locking member 9 which holds the locking member 6 at a locked position when the cover 2 is removed from the housing 3.

Figure 10:
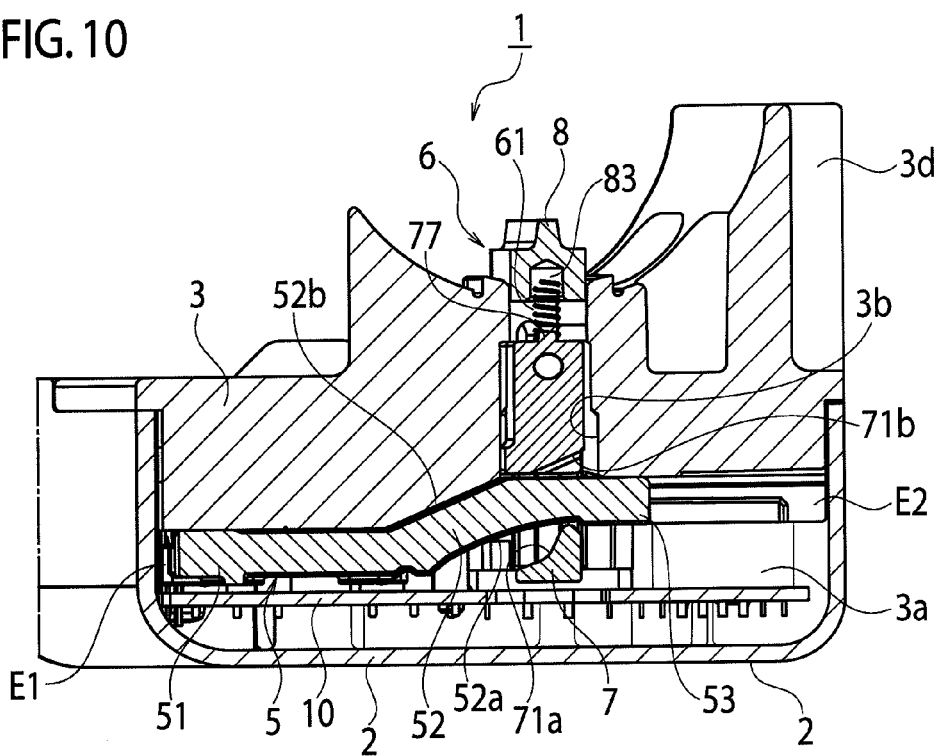
FIG. 10 is a cross-sectional view showing a state in which a sliding member according to First Embodiment of the present invention is displaced to a locked position.
Figure 11:
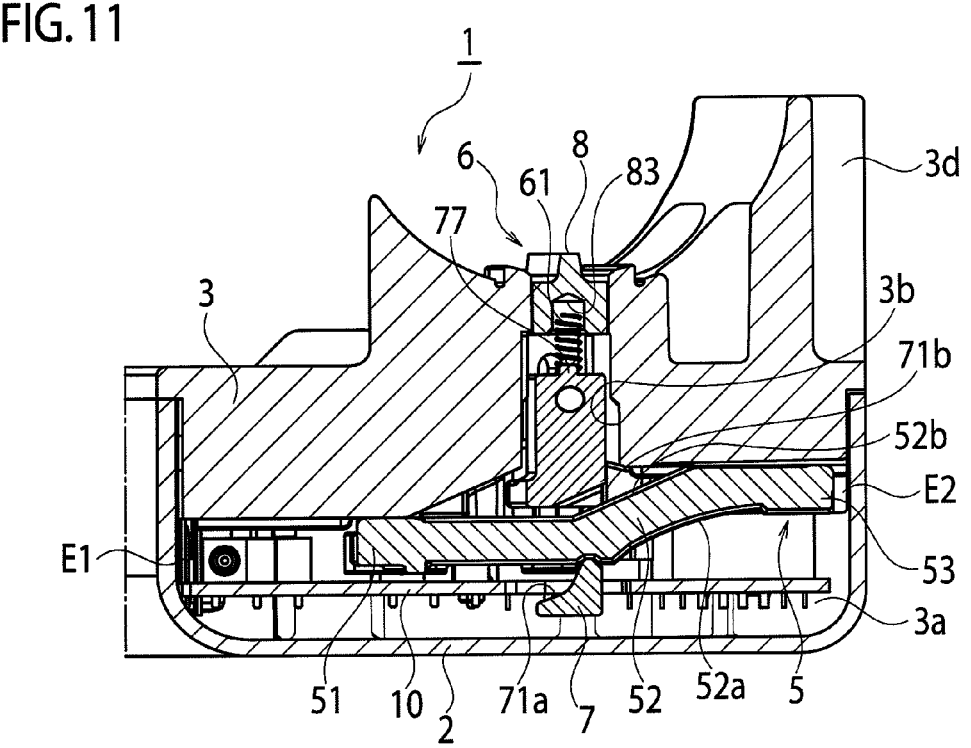
FIG. 11 is a cross-sectional view showing a state in which the sliding member according to First Embodiment of the present invention is displaced to an unlocked position.

As shown in FIGS. 10 and 11, the sliding member 5 includes a base portion 51, an inclined portion 52, and a distal end portion 53. The base portion 51 extends in a sliding direction. The inclined portion 52 protrudes from one end of the base portion 51 and becomes gradually inclined in a direction to the steering shaft (an up-down direction in FIGS. 10 and 11), extending toward a distal end of the sliding member 5. The distal end portion 53 protrudes from the inclined portion 52 in the sliding direction. The base portion 51 is provided with a rack portion in mesh with a drive gear, although illustration of the rack portion is omitted. The inclined portion 52 has an unlocking inclined portion 52a on the cover 2 side and a locking inclined portion 52b on the housing 3 side.

The sliding member 5 is arranged to be slidable between a locking end E1 and an unlocking end E2. When the sliding member 5 is slid, the locking member 6 moves along the inclined portion 52. Thereby, the sliding member 5 is displaced between the locked position in FIG. 10 at which the locking member 6 prevents rotation of the steering shaft and an unlocked position in FIG. 11 at which the rotation of the steering shaft is allowed.

The locking member 6 includes a hanger 7, the lock main body 8, a coil spring 61, and a coupling pin 62. The hanger 7 forms a proximal end side of the locking member 6 and is engaged with the sliding member 5. The lock main body 8 forms a distal end side of the locking member 6 and is coupled to the hanger 7. An end of the lock main body 8 moves through a bottom surface of a recessed portion of the housing 3 and is engageable with the steering shaft. The coil spring 61 is arranged between the hanger 7 and the lock main body 8 and serves as urging means for urging the lock main body 8 from the unlocked position side toward the locked position side. The coupling pin 62 connects the hanger 7 and the lock main body 8. The locking member 6 has a wide face B parallel to the axial direction of the steering shaft and a thick face C (a side face of an arm portion 74 to be described later) perpendicular to the wide face B. The thick face C is provided with a protrusion formed by an end portion of the coupling pin 62 to be described later.

Figure 7:
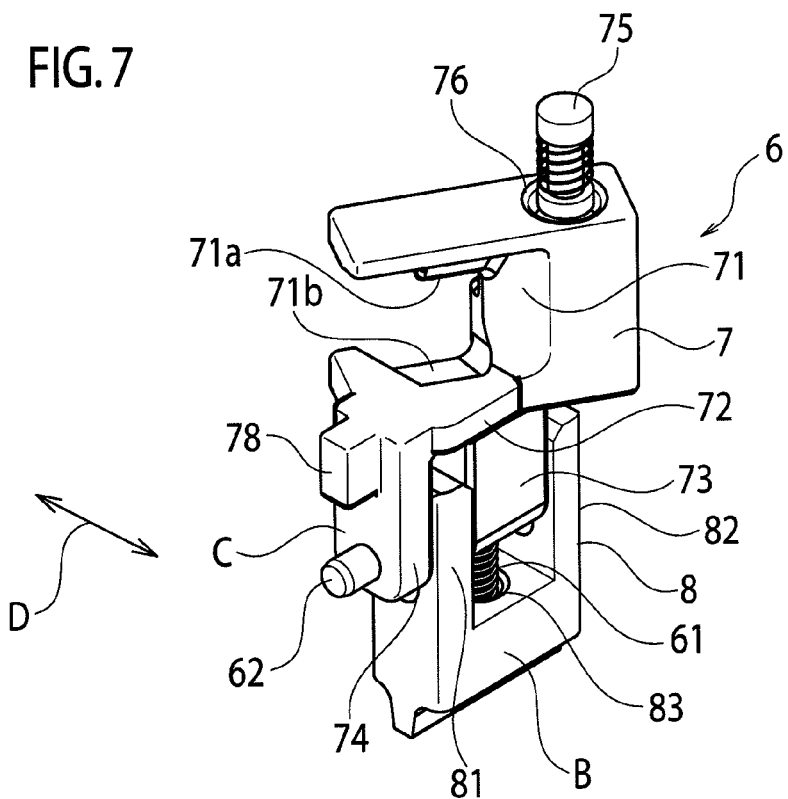
FIG. 7 is a perspective view showing a locking member according to First Embodiment of the present invention.
Figure 8:
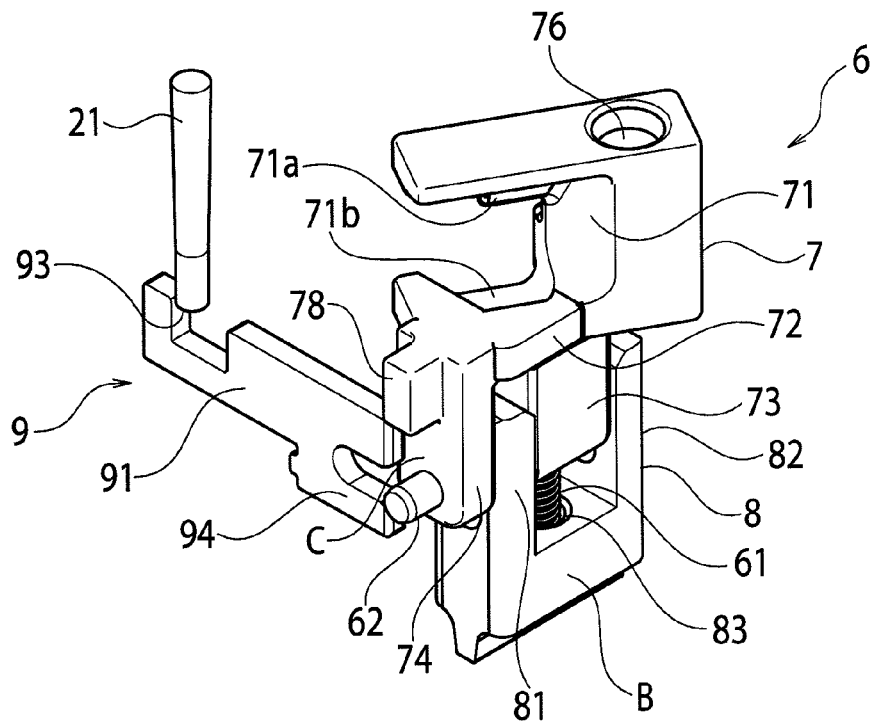
FIG. 8 is a perspective view showing a state in which a holding portion of the cover is engaged with a sliding plate according to First Embodiment of the present invention.
Figure 9:
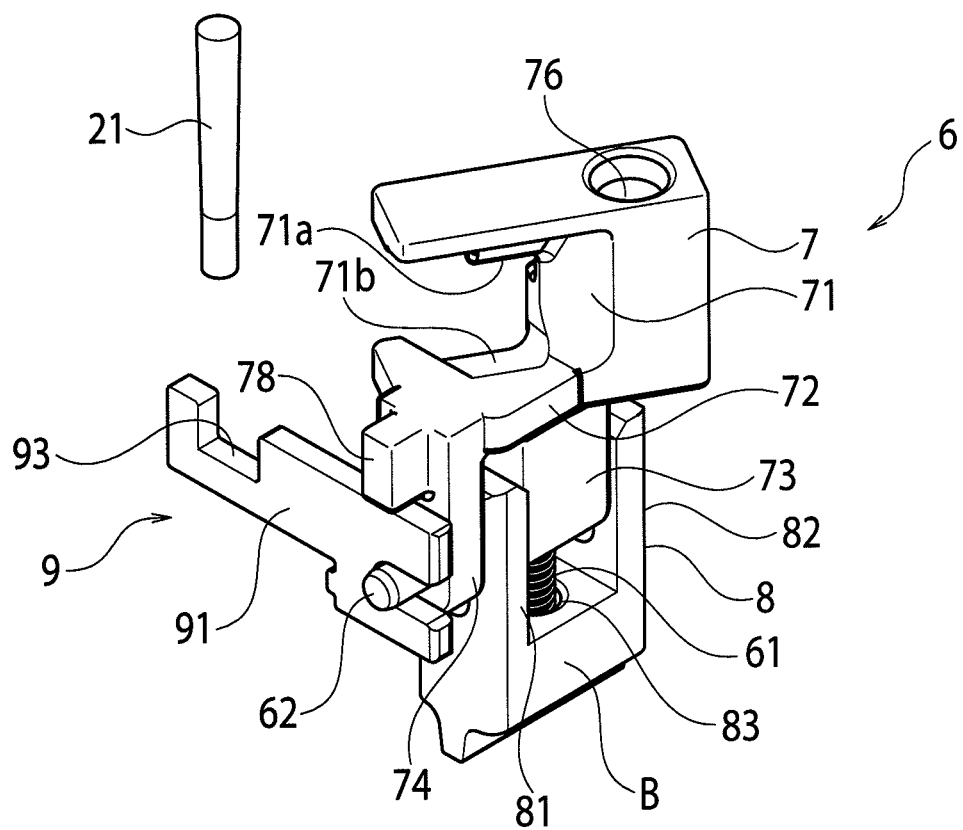
FIG. 9 is a perspective view showing a state in which the holding portion of the cover is disengaged from the sliding plate according to First Embodiment of the present invention.

As shown in FIGS. 7 to 9, the hanger 7 has a substantially U-shaped cross-section, and includes a base portion 72, a coupling portion 73, and the arm portion 74. The base portion 72 includes an inclination receiving portion 71 into which the sliding member 5 is inserted. The coupling portion 73 protrudes from the base portion 72 in the direction to the steering shaft (toward the distal end side of the locking member 6). The arm portion 74 protrudes from the base portion 72 in the direction to the steering shaft and is arranged in parallel with the thick face C while being a predetermined distance away from the coupling portion 73. A face (the wide face B) including the coupling portion 73 and the arm portion 74 in a width direction thereof is arranged in parallel with the axial direction of the steering shaft. Round holes 73a, 74a in which the coupling pin 62 are fitted extend in the width direction. A width dimension of the inclination receiving portion 71 is set slightly larger than width dimensions of the base portion 51, the inclined portion 52, and the distal end portion 53 of the sliding member 5. An unlocking inclined portion 71a and a locking inclined portion 71b are respectively formed on edge portions of the inclination receiving portion 71 in a height direction thereof. The unlocking inclined portion 71a and the locking inclined portion 71b are respectively formed on the edge (a surface on the lower side in FIGS. 10 and 11) on the cover 2 side of the inclination receiving portion 71 and on the edge (a surface on the upper side in FIGS. 10 and 11) on the housing 3 side of the inclination receiving portion 71, while being inclined at the same inclination angle as that of the inclined portion 52 of the sliding member 5. The unlocking inclined portion 71a is formed to be curved with respect to the unlocking inclined portion 52a of the inclined portion 52, while the locking inclined portion 71b is formed to protrude toward the locking inclined portion 52b of the inclined portion 52. Thereby, when the sliding member 5 is slid, the inclination receiving portion 71 of the hanger 7 and the sliding member 5 come into line-contact with each other, instead of area-contact, to reduce sliding resistance between the sliding member 5 and the hanger 7 and thus to reduce operation malfunctions.

A spring seat hole 76 receiving an end of a coil spring 75 which is urging means is formed in an end portion of the base portion 72 on the cover 2 side. A spring seat 77 receiving an end of the coil spring 61 is formed on an end portion of the coupling portion 73 on the steering column device A side. A protrusion 78 is formed on a side face (that is, the thick face C of the locking member 6) of the arm portion 74, the protrusion 78 being arranged in parallel to and a predetermined distance away from the coupling pin 62 on the cover 2 side.

As shown in FIGS. 7 to 9, a pair of arm portions 81, 82 protruding in a direction to the hanger 7 (upward in FIGS. 7 and 9) are provided on an end portion on the proximal end side of the lock main body 8. Long holes 81a, 82a extending in a moving direction of the hanger 7 are provided in the arm portions 81, 82, respectively. The coupling pin 62 is movably inserted into the long holes 81a, 82a. A spring seat hole 83 receiving the other end of the coil spring 61 is formed in an end portion of the lock main body 8 between the arm portions 81, 82 on the cover 2 side.

The auxiliary locking member 9 has a sliding plate 91 and a coil spring 92. The sliding plate 91 extends from the wide face B of the locking member 6 in a plate thickness direction (a direction shown by the arrow D in FIG. 7) of the locking member 6. The coil spring 92 urges the sliding plate 91 in a direction to the coupling pin 62 of the locking member 6 toward an engaged position. The sliding plate 91 and the coil spring 92 are arranged to be slidable between the engaged position and a disengaged position and outward of the wide face B of the locking member 6. At the engaged position, the sliding plate 91 is engaged with the protrusion of the locking member located at the locked position. At the disengaged position, the locking member is separated away from the protrusion and is allowed to slide. An engagement recessed portion 93 is formed on one end side of the sliding plate 91, as shown in FIG. 8. An end of a holding portion 21 protruding inward from a back surface of the cover 2 is engaged with the engagement recessed portion 93. A fork-shaped engagement end portion 94 is formed on the other end of the sliding plate 91, as shown in FIG. 9, the engagement end portion 94 receiving the coupling pin 62 in such a manner as to hold the coupling pin 62 from above and below.

Figure 6:
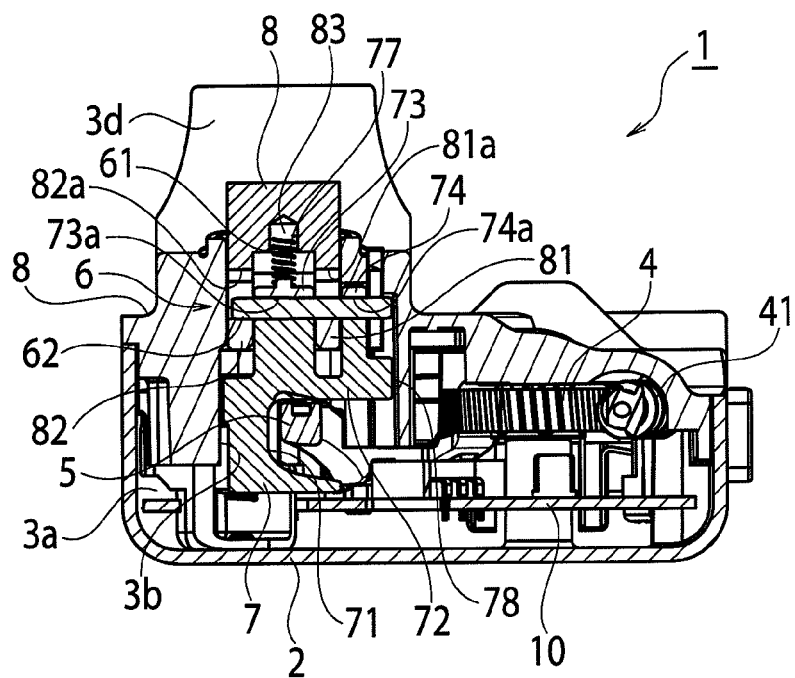
FIG. 6 is a cross-sectional view taken along the VI-VI line in FIG. 4.

Next, a description is given of an assembling process of the steering locking device 1. Firstly, with the coil spring 61 arranged in the spring seat hole 83 of the lock main body 8 and on the spring seat 77 of the hanger 7, the hanger 7 is coupled to the lock main body 8 while being placed from sideways. While the coupling portion 73 is received between the arm portions 81, 82 of the lock main body 8, the arm portion 81 of the lock main body 8 is received between the coupling portion 73 and the arm portion 74, so that the hanger 7 and the lock main body 8 are coupled to each other with the coupling pin 62. Thereby, as shown in FIG. 6, the coupling pin 62 is inserted into the long holes 81a, 82a of the arm portions 81, 82, and is fitted in the round holes 73a, 74a of the respective coupling portion 73 and the arm portion 74, so that the one end of the coupling pin 62 protrudes outward from the thick face C of the arm portion 74. Next, the sliding member 5 is inserted into the inclination receiving portion 71 of the hanger 7. The sliding member 5, the hanger 7, and the lock main body 8 are assembled together in this manner to be accommodated in the component accommodating chamber 3a of the housing 3, and the lock main body 8 and the hanger 7 are accommodated in the lock accommodating hole 3b of the housing 3.

Next, the worm wheel 4 is arranged at a predetermined position in the component accommodating chamber 3a of the housing 3, and the drive gear is brought into mesh with the rack portion of the sliding member 5. The motor is arranged near the worm wheel 4, and the worm gear 41 of the revolving shaft is brought into mesh with the worm wheel 4. Next, a printed circuit board 10 is arranged in an upper portion of the component accommodating chamber 3a to perform wiring thereon, and the printed circuit board 10 is screwed inside the component accommodating chamber 3a. Thereafter, the coil spring 75 is placed in the spring seat hole 76 of the hanger 7, and the cover 2 is attached to the housing 3 to thereby cover the component accommodating chamber 3a.

Next, the sliding plate 91, the coil spring 92, and a closure member 11 to be described later are integrally attached to an assembling jig 15, and the assembly is inserted into the auxiliary lock accommodating hole 3c. In a state where an elastic claw 13 provided on the closure member 11 is engaged with an engagement step portion 3e in the auxiliary lock accommodating hole 3c, the assembling jig 15 is pulled out. Thereby, assembling is completed. Note that a step of attaching the sliding plate 91 will be described in detail in Fourth Embodiment.

After the steering locking device 1 is assembled in this manner, the steering locking device 1 is attached to the steering column device A while the pair of leg portions 3d, 3d stride over the steering column device A.

Next, a description is given of an operation of the steering locking device 1. At the time of locking the lock main body 8 shown in FIGS. 3 to 6 and the like, the sliding member 5 is located on the locking end E1 side as shown in FIG. 10, and the distal end portion 53 and the inclined portion 52 of the sliding member 5 are engaged with the inclination receiving portion 71 of the hanger 7. Thus, the lock main body 8 coupled to the hanger 7 is located at the locked position. That is, the lock main body 8 protrudes from the bottom surface of the recessed portion of the housing 3 to be fitted in the steering shaft. As the result, the rotation of the steering shaft is prevented, and thus the automobile is kept unsteerable.

Next, when output of an unlocking signal causes the motor to rotate in the unlocking direction in the locked state, the drive gear drives the rack portion with the worm gear 41 and the worm wheel 4 placed in between. Thus, the sliding member 5 starts moving from the locking end E1 side to the unlocking end E2 side. This causes the hanger 7 to move along the inclined portion 52 while the unlocking inclined portion 52a of the sliding member 5 is in engagement-contact with the unlocking inclined portion 71a of the hanger 7.

Thereby, the lock main body 8 is separated from the steering shaft in conjunction with the moving of the hanger 7 and is displaced to the unlocked position.

Next, further rotation of the motor in the unlocking direction results in the unlocked state shown in FIG. 11. The lock main body 8 moves backward in the housing 3 and is displaced to the unlocked position to allow the steering shaft to rotate. Thus, the automobile becomes steerable.

Next, when the output of a locking signal results in a locked state again, the motor is driven and causes the worm wheel 4 to rotate in the locking direction. Then, the lock main body 8 is displaced to the locked position following the sliding member 5. At this time, the hanger 7 and the lock main body 8 are urged by the coil spring 75 from the cover 2 side to the steering column device A side, and the lock main body 8 is also urged by the coil spring 61 in the aforementioned direction. This involves movement of the hanger 7 along the inclined portion 52 with the locking inclined portion 52b of the sliding member 5 in engagement-contact with the locking inclined portion 71b of the hanger 7. Thereby, the lock main body 8 is displaced in conjunction with this toward the steering shaft. As the result, the lock main body 8 is fitted in the steering shaft to prevent the rotation of the steering shaft. Thus, the automobile becomes unsteerable. At this time, suppose a case where, for example, the lock main body 8 is engaged with an outer peripheral portion between engagement grooves for the steering shaft, instead of the engagement grooves. In this case, when the steering shaft is rotated thereafter, the lock main body 8 is urged by the coil spring 61 to be fitted in the engagement grooves for the steering shaft, and thus the rotation of the steering shaft is prevented.

Figure 5:
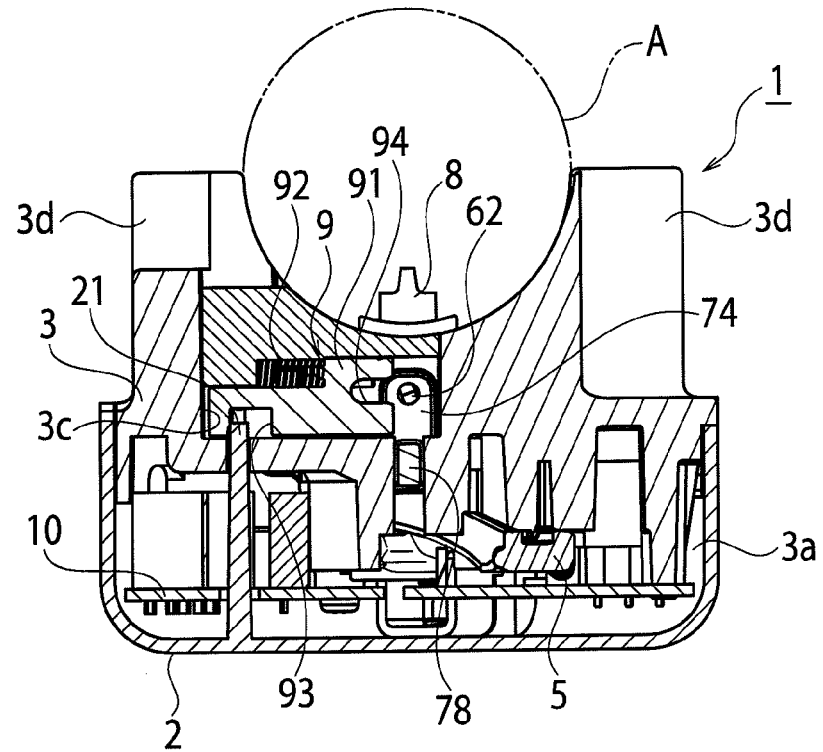
FIG. 5 is a cross-sectional view taken along the V-V line in FIG. 3.
Figure 12:
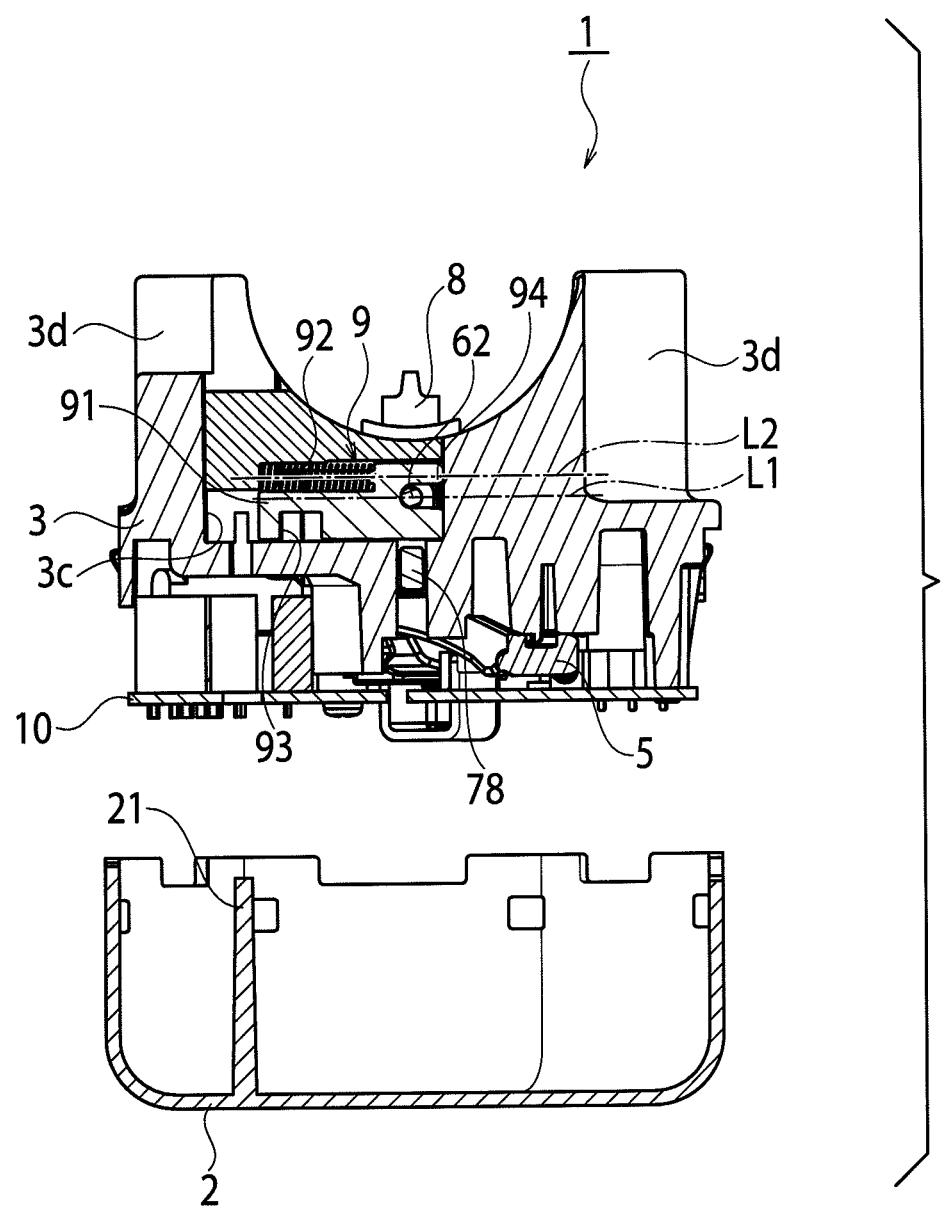
FIG. 12 is a cross-sectional view taken along the V-V line in FIG. 3, showing a state in which the cover is removed from the housing.

Meanwhile, as shown in FIG. 5, the sliding plate 91 is urged and held on the engaged position side due to an urging force of the coil spring 92. Thus, when the cover 2 is removed from the housing 3 due to an unauthorized action in the locked state, the holding portion 21 of the cover 2 is disengaged from the engagement recessed portion 93 of the sliding plate 91. The sliding plate 91 moves from the disengaged position to the engaged position, and the engagement end portion 94 of the sliding plate 91 engages the coupling pin 62 of the lock main body 8 in such a manner as to hold the coupling pin 62 from above and below. This prevents the movement of the locking member 6 (the hanger 7 and the lock main body 8) as shown in FIG. 12, keeping the locked state of the steering shaft caused by the lock main body 8.

As described above, the coupling pin 62 with which the sliding plate 91 is engaged is provided to the locking member 6 in this embodiment, instead of the engagement groove in the locking member as in the related steering locking device. Thus, it is possible to make the locking member 6 compact while ensuring the rigidity of the locking member 6, and it is relatively easy to arrange the components in a limited space. Moreover, the sliding plate 91 engaged with the coupling pin 62 extends from the wide face B of the locking member 6 in the plate thickness direction (the direction shown by the arrow D in FIG. 7) of the locking member 6, and the auxiliary locking member 9 including the sliding plate 91 is arranged outside the wide face B of the locking member 6. Thus, it is possible to set the position of the auxiliary locking member 9 at a position at which there exists no space allowing an act of an unauthorized unlocking operation, for example, at a position on the front side of the vehicle and thus to reduce possibility of suffering from the act of the authorized unlocking operation. Further, since the auxiliary locking member 9 is provided with the plate-shaped sliding plate 91, the auxiliary lock accommodating hole 3c in the housing 3 accommodating the auxiliary locking member 9 can be made small, and influence of the unauthorized unlocking operation on the housing 3 can be reduced. Accordingly, it is possible to prevent the problem that the vehicle becomes steerable due to the unauthorized unlocking operation at the time of parking of the vehicle and possible to enhance the vehicle theft prevention at the time of parking of the vehicle.

In First Embodiment, the coupling pin 62 connecting the hanger 7 and the lock main body 8 of the locking member 6 forms the protrusion with which the sliding plate 91 is engaged, and thus the protrusion eliminates the need to specially provide another component or another portion.

In First Embodiment, the coupling pin 62 protrudes outward from the arm portion 74 of the hanger 7. Thus, the length of the protrusion of the coupling pin 62 can be limited to reduce a bending force acting on the coupling pin 62, and thus the durability of the coupling pin 62 can be enhanced. In addition, the influence of the unauthorized unlocking operation performed on the locking member 6 can be reduced, and thus enhancement of the theft prevention can be achieved.

In First Embodiment, when the sliding plate 91 is engaged with the coupling pin 62, the fork-shaped engagement end portion 94 holds the coupling pin 62 in such a manner that the coupling pin 62 is held from above and below. Thus, even if a force in a sliding direction is applied to the locking member 6, the sliding plate 91 can prevent wobbling more reliably. In addition, one end of the fork-shaped engagement end portion 94 is held between the protrusion 78 of the arm portion 74 of the hanger 7 and the coupling pin 62. Thus, when a force is applied to the sliding plate 91 in a direction of rotating the sliding plate 91 about the coupling pin 62, the protrusion 78 of the arm portion 74 prevents the rotation of the sliding plate 91. These also can reduce the influence of the unauthorized unlocking operation performed on the locking member 6 and the sliding plate 91 and achieve the enhancement of the theft prevention.

In the conventional configuration of the auxiliary locking member, a tubular pin (not shown) is used instead of the sliding plate 91, and the coil spring is arranged inside the pin. In order to hold the tubular pin at a disengaged position, holding means needs to be engaged with an end of the tubular pin. However, the auxiliary locking member 9 in this embodiment uses the sliding plate 91 which is the plate-shaped member, and thereby the degree of freedom of the shape of the sliding plate 91 is enhanced, and the engagement recessed portion 93 can be set at any position of the sliding plate 91.

Moreover, in order to hold the sliding plate 91 at the disengaged position, the sliding plate 91 is formed as the plate-shaped member for a portion in which the holding means 21 and the sliding plate 91 are engaged with each other. This also makes it possible to change the shape of the sliding plate 91 according to the position of an end of the holding means 21, instead of extending the holding means 21 according to the position of the sliding plate 91.

Moreover, in the tubular pin, the central axis of the coil spring is set to overlap with an operating axis which serves as the center line when the tubular pin moves. However, forming the sliding plate 91 as the plate-shaped member makes it possible to set a central axis L2 of the coil spring 92 on an axis other than a plate operating axis L1 as an axis along which a fork-shaped forked portion 95 moves to engage the coupling pin 62, as shown in FIG. 12. This enables the dimensions of the sliding plate 91 in the direction of sliding the sliding plate 91 to be made smaller when the central axis L2 and the plate operating axis L1 are set parallel to each other, and thus facilitates arrangement of the auxiliary locking member 9 in the steering locking device 1.

Figure 13:
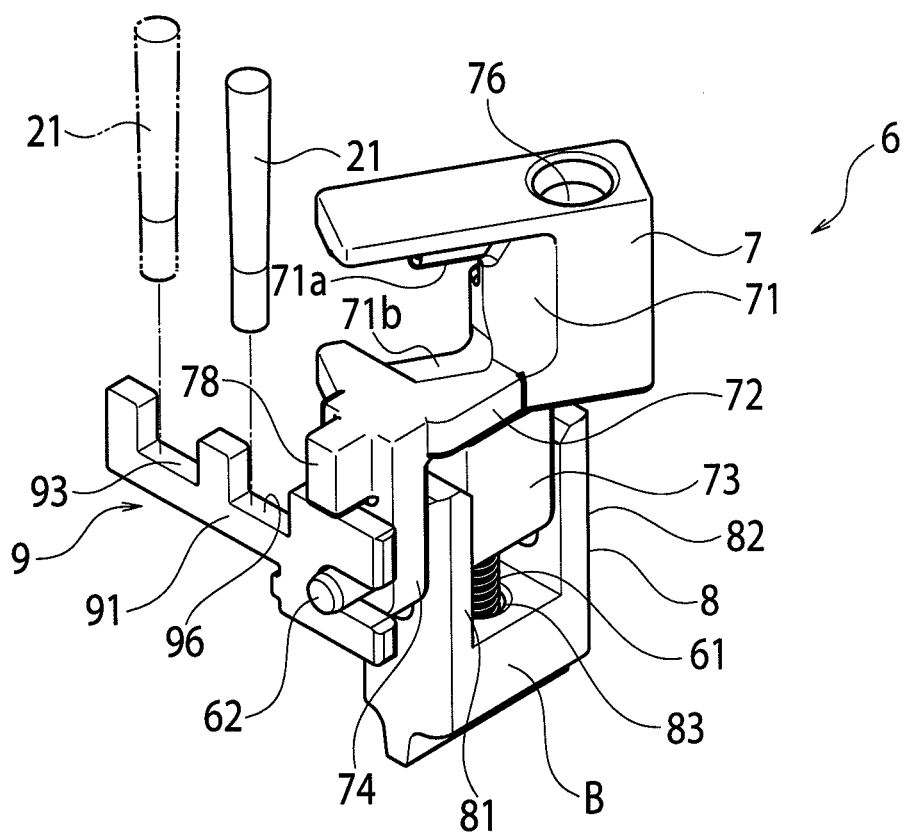
FIG. 13 shows a different mode of First Embodiment of the present invention and is a perspective view showing a state in which means for holding the cover is disengaged from the sliding plate.

FIG. 13 shows a different mode of First Embodiment of the present invention and is a perspective view showing a state in which means for holding the cover is disengaged from the sliding plate.

In the auxiliary locking member 9 in the different mode, the sliding plate 91 has a changed shape, and a second engagement recessed portion 96 is provided on the fork-shaped forked portion 95 side of the engagement recessed portion 93, the forked portion 95 being provided to the engagement end portion 94.

Shaping the sliding plate 91 like this can cope with a case where the configuration or arrangement in the component accommodating chamber 3a is changed and thus where the position of the holding means 21 of the cover 2 is changed from a position shown by a dashed line shown in FIG. 13 to a position shown by a solid line. Simply replacing the sliding plate 91 with one in this mode of the embodiment is required without the need to change the other configuration of the auxiliary locking member 9. Moreover, in this different mode, it is possible to arrange components of the steering locking device 1 other than the auxiliary locking member 9 with priority given to functions of the other components and then arrange the auxiliary locking member 9 by utilizing a remaining space. Further, even after the position of the holding means 21 is determined, the position of the coil spring 92 can be set.

Second Embodiment

Figure 14:
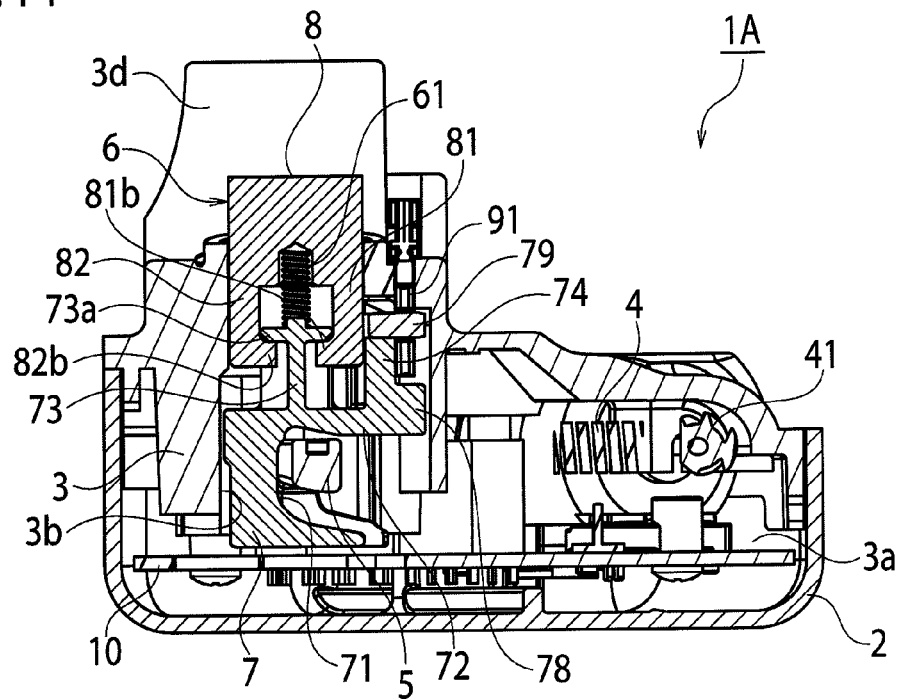
FIG. 14 is a cross-sectional view taken along the VI-VI line in FIG. 4, showing a locked state of a steering locking device according to Second Embodiment of the present invention.

FIG. 14 shows Second Embodiment of the present invention and is a cross-sectional view showing a steering lock device.

In a steering locking device 1A in Second Embodiment, the coupling portion 73 of the hanger 7 has a swelling-out portion 73a formed by swelling out of the hanger 7 toward both sides thereof, the arm portions 81, 82 of the lock main body 8 have bent ends 81b, 82b protruding in directions of approaching to each other, and the lock main body 8 is movably coupled to the hanger 7. The bent ends 81b, 82b can lock the swelling-out portion 73a of the hanger 7. The locking member 6 has the wide face B parallel to the axial direction of the steering shaft and the thick face C (the side face of the arm portion 74) perpendicular to the wide face B. The thick face C is provided with an engagement pin 79 as a protrusion engaged with the sliding plate 91. As compared with the steering locking device 1 in First Embodiment, the configuration is the same as that in First Embodiment except the structure of coupling the hanger 7 and the lock main body 8 and the engagement pin 79. Parts in the same configuration as that in First Embodiment are denoted by the same reference numerals in the drawings, and descriptions thereof will be omitted.

In the aforementioned configuration, when the cover 2 is removed from the housing 3 in the locked state, the holding portion 21 of the cover 2 is disengaged from the sliding plate 91, and the sliding plate 91 is urged in the direction to the hanger 7. Thus, the sliding plate 91 becomes engaged with the engagement pin 79 of the hanger 7. This prevents the movement of the hanger 7 and the lock main body 8, thus keeping the state of locking the steering shaft by the lock main body 8.

As described above, according to Second Embodiment, the engagement pin 79 with which the sliding plate 91 is engaged is provided to the locking member 6, and thus it is possible to make the locking member 6 compact while ensuring the rigidity of the locking member 6. Moreover, it is possible to set the position of the auxiliary locking member 9 at a position at which there exists no space allowing an act of an unauthorized unlocking operation, for example, at a position on the front side of the vehicle and thus to reduce possibility of suffering from the act of the authorized unlocking operation. Further, since the auxiliary lock accommodating hole 3c in the housing 3 accommodating the auxiliary locking member 9 can be made small, influence of the unauthorized unlocking operation on the housing 3 can be reduced. Also from this viewpoint, the enhancement of the theft prevention can be achieved.

Third Embodiment

Figure 15:
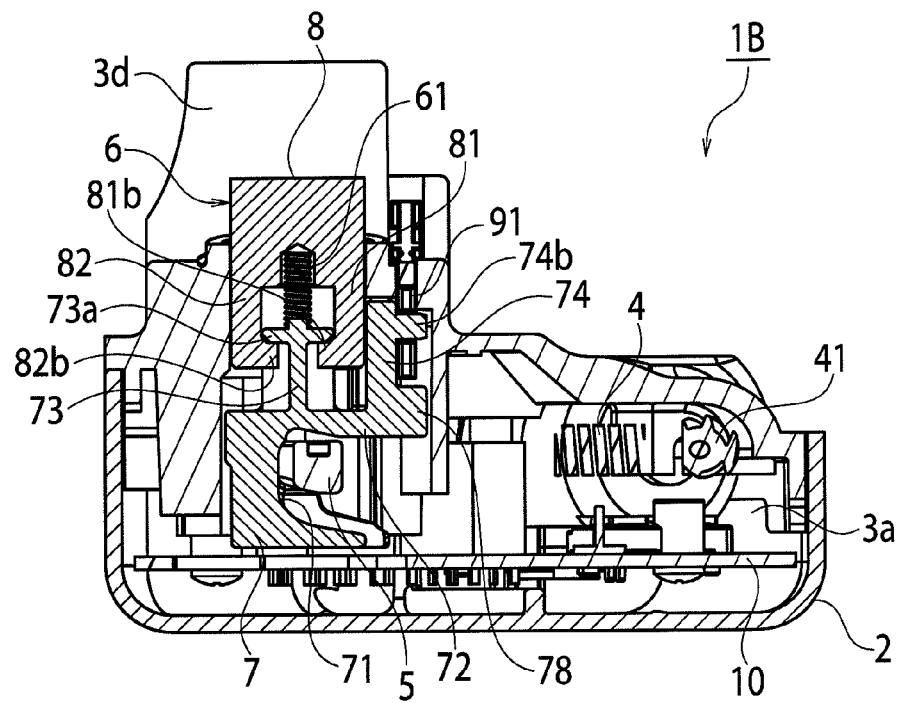
FIG. 15 is a cross-sectional view taken along the VI-VI line in FIG. 4, showing a locked state of a steering locking device according to Third Embodiment of the present invention.
Figure 16:
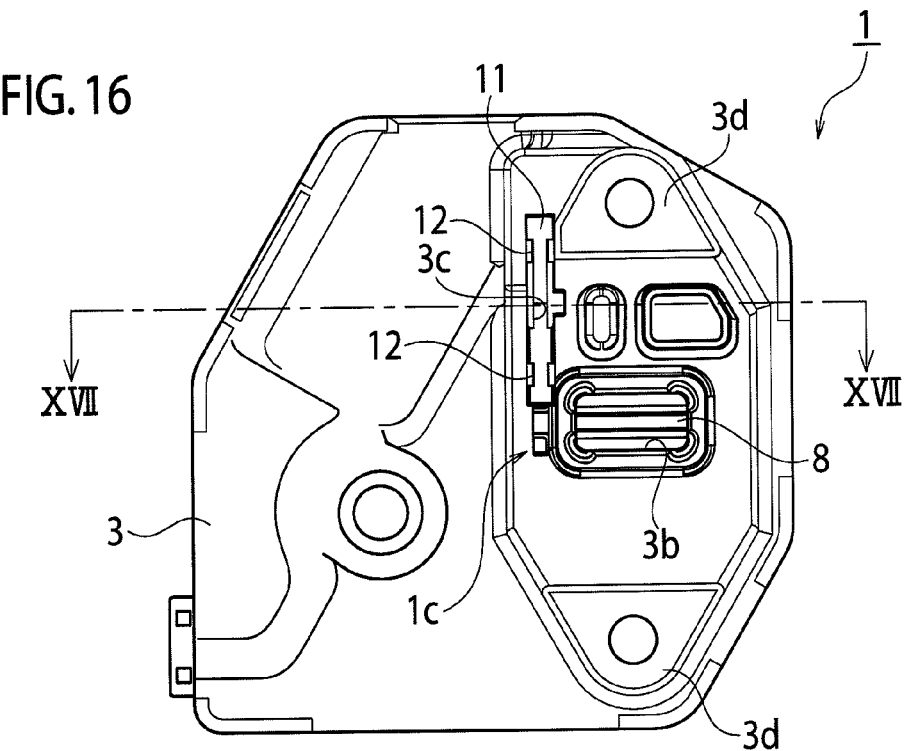
FIG. 16 is a plan view showing a locked state of a steering locking device according to Fourth Embodiment of the present invention, viewed from the steering shaft side.
Figure 17:
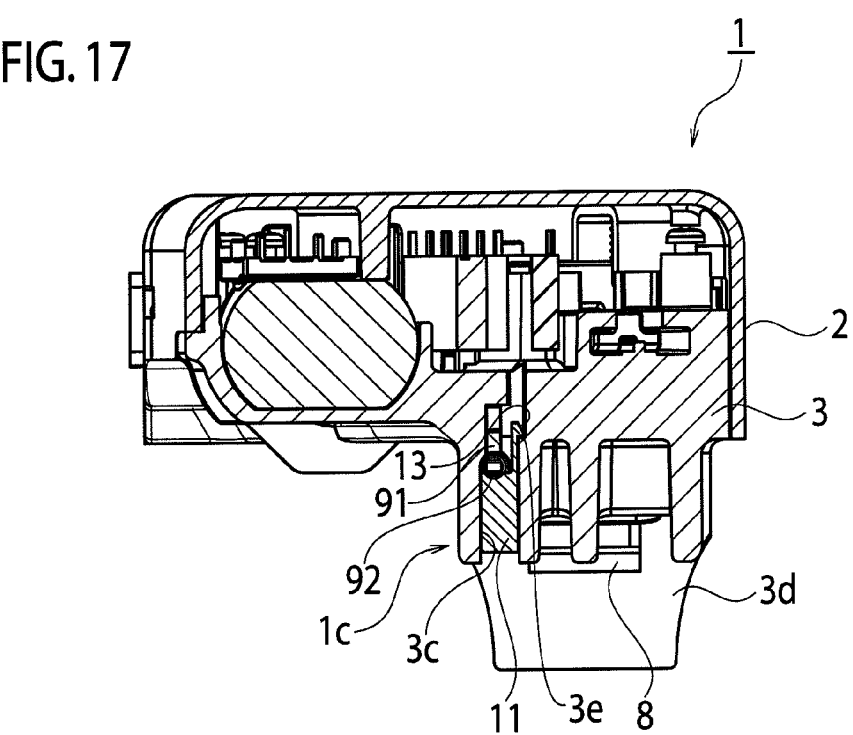
FIG. 17 is a cross-sectional view taken along the XVII-XVII line in FIG. 16.
Figure 18:
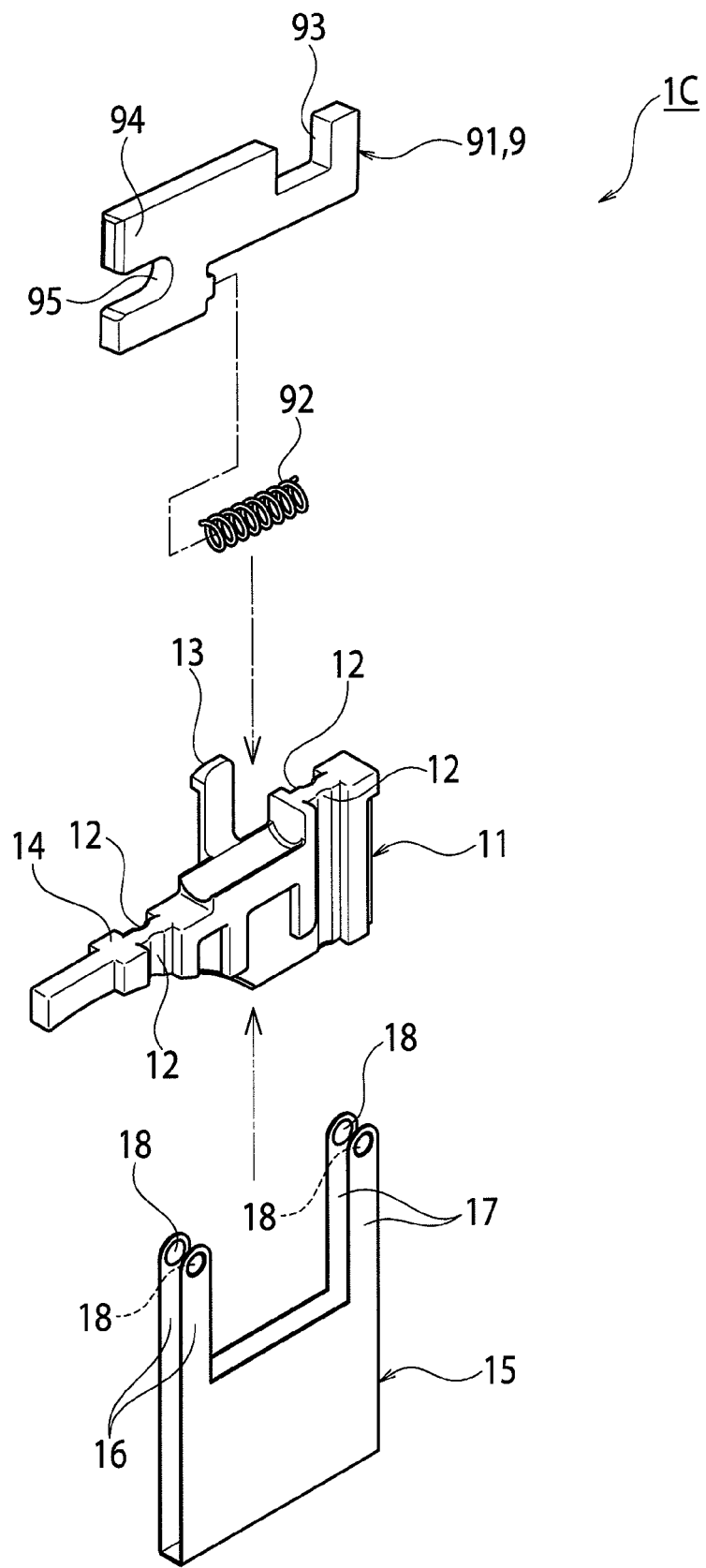
FIG. 18 is an exploded perspective view of an auxiliary lock assembly body according to Fourth Embodiment of the present invention.
Figure 19:
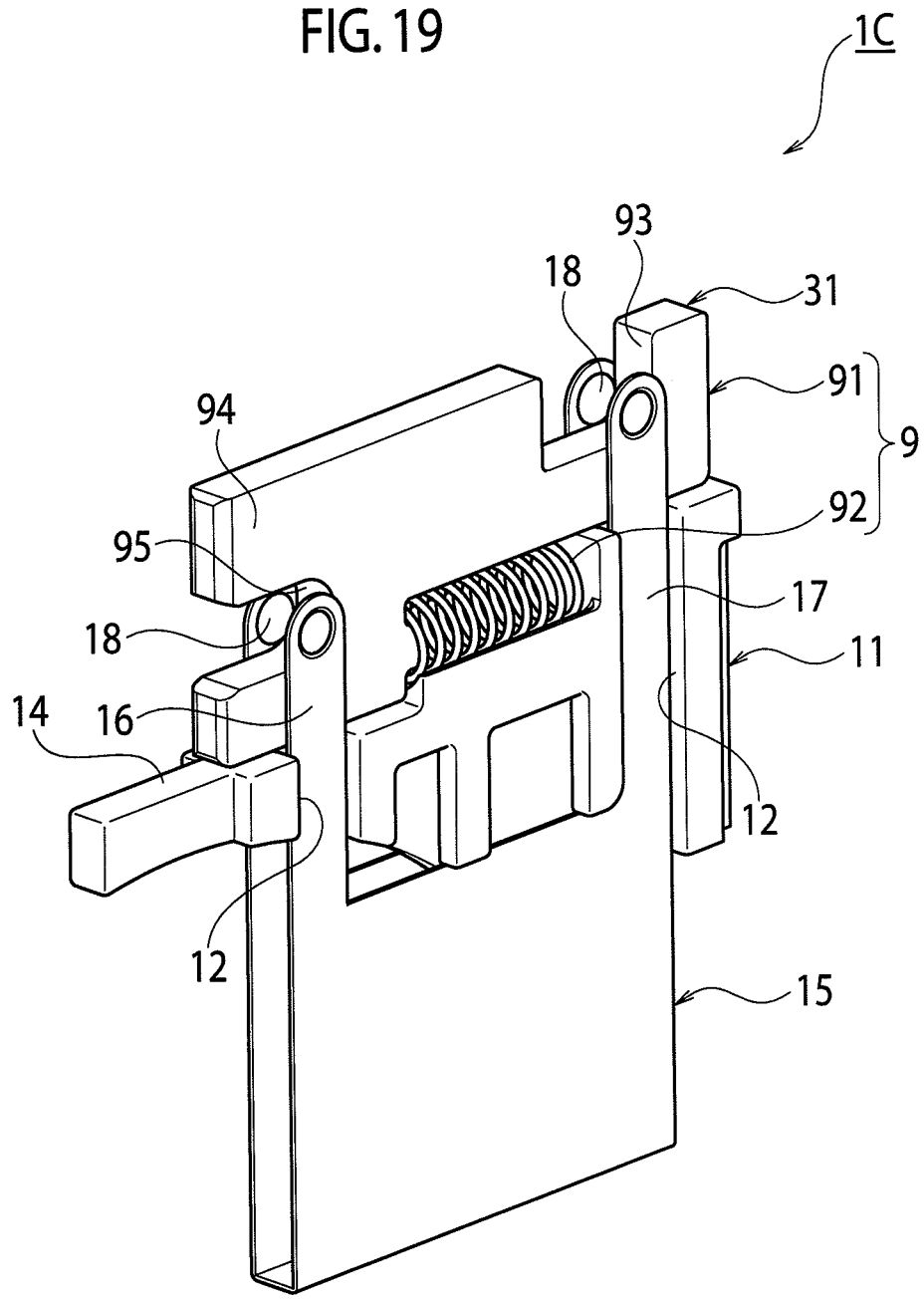
FIG. 19 is an assembled perspective view of the auxiliary lock assembly body according to Fourth Embodiment of the present invention.

FIG. 15 shows Third Embodiment of the present invention and is a cross-sectional view showing a steering locking device.

In a steering locking device 1B in Third Embodiment, a protrusion 74b engaged with the sliding plate 91 is provided on a side face of the arm portion 74 of the hanger 7. As compared with the steering locking device 1A in Second Embodiment, the configuration is the same as that in Second Embodiment except the protrusion 74b. Parts in the same configuration as that in Second Embodiment are denoted by the same reference numerals in the drawings, and descriptions thereof will be omitted.

In the aforementioned configuration, when the cover 2 is removed from the housing 3 in the locked state, the holding portion 21 of the cover 2 is disengaged from the sliding plate 91, and the sliding plate 91 is urged in the direction to the hanger 7. Thus, the sliding plate 91 becomes engaged with the protrusion 74b of the hanger 7. This prevents the movement of the hanger 7 and the lock main body 8, thus keeping the state of locking the steering shaft by the lock main body 8.

As described above, according to Third Embodiment, the protrusion 74b with which the sliding plate 91 is engaged is provided to the locking member 6, and thus it is possible to make the locking member 6 compact while ensuring the rigidity of the locking member 6. Moreover, it is possible to set the position of the auxiliary locking member 9 at a position at which there exists no space allowing an act of an unauthorized unlocking operation, for example, at a position on the front side of the vehicle and thus to reduce possibility of suffering from the act of the authorized unlocking operation. Further, since the auxiliary lock accommodating hole 3c in the housing 3 accommodating the auxiliary locking member 9 can be made small, influence of the unauthorized unlocking operation on the housing 3 can be reduced. Also from this viewpoint, the enhancement of the theft prevention can be achieved.

Fourth Embodiment

FIGS. 16 to 19 show Fourth Embodiment of the present invention. An auxiliary lock attached structure 10 for attaching the auxiliary locking member 9 to the housing 3 is described as Fourth Embodiment and is applicable to First to Third Embodiments described above. Accordingly, as compared with the steering locking device 1 in First Embodiment, the configuration is the same as that in First Embodiment except the auxiliary lock attached structure 10. Parts in the same configuration as that in First Embodiment are denoted by the same reference numerals in the drawings, and descriptions thereof will be omitted.

The auxiliary lock attached structure 10 includes the auxiliary locking member 9 (the sliding plate 91 and the coil spring 92), the closure member 11, the assembling jig 15, and the engagement step portion 3e formed in the auxiliary lock accommodating hole 3c of the housing 3.

The closure member 11 includes a jig groove 12, the elastic claw 13, and a plate slide-contact portion 14, and is inserted into the auxiliary lock accommodating hole 3c provided in the housing 3 without wobbling. The jig groove 12 is formed in a direction of attaching the closure member 11 to the auxiliary lock accommodating hole 3c, and elastic arm portions 16, 17 of the assembling jig 15 to be described later are formed to be slidable inside the groove. The elastic claw 13 is formed on an end of an elastic arm portion. The plate slide-contact portion 14 holds one end of the coil spring 92 and is set so that the sliding plate 91 can freely move between the disengaged position and the engaged position.

The auxiliary lock accommodating hole 3c of the housing 3 is opened in a surface, of the housing 3, facing the steering column device A. Inside the auxiliary lock accommodating hole 3c, the engagement step portion 3e with which the elastic claw 13 is engaged is provided.

The assembling jig 15 is formed by bending a plate-shaped elastic material into a U shape and has two pairs of the elastic arm portions 16, 17 in portions facing each other. Semispherical temporary locking protrusions 18 respectively protrude from inner surfaces of the elastic arm portions 16, 17 in end portions thereof.

The sliding plate 91, the closure member 11, and the assembling jig 15 are configured as follows. Specifically, the auxiliary locking member 9 is placed on the closure member 11, and the assembling jig 15 is attached to the closure member 11. In this state, the elastic arm portions 16, 17 are arranged in the jig groove 12. In addition, while the temporary locking protrusion 18 of the elastic arm portion 16 in the first pair is engaged with the engagement recessed portion 93 of the sliding plate 91, the temporary locking protrusion 18 of the elastic arm portion 16 in the second pair is engaged with the forked portion 95 of the fork-shaped engagement end portion 94 of the sliding plate 91.

The temporary locking protrusion 18 is engaged with the engagement recessed portion 93 and the forked portion 95 with the assembling jig 15 attached to the closure member 11. Thereby, the assembly can be handled as an auxiliary lock assembly body 31 while the sliding plate 91 is kept at an initial position (on the disengaged position side in the state where the sliding plate 91 is placed in the auxiliary lock accommodating hole 3c) against an urging force of the coil spring 92.

The auxiliary lock assembly body 31 is configured as follows. Specifically the auxiliary lock assembly body 31 is inserted into the auxiliary lock accommodating hole 3c with the assembling jig 15 attached thereto. When the auxiliary lock assembly body 31 reaches a predetermined position, the elastic claw 13 of the closure member 11 is engaged with the engagement step portion 3e provided in the auxiliary lock accommodating hole 3c and thus is impossible to pull out. The auxiliary locking member 9 and the closure member 11 are arranged in the auxiliary lock accommodating hole 3c.

In the configuration described above, the sliding plate 91 is held on the disengaged position side by the assembling jig 15. Thus, the cover 2 can be attached to the housing 3 with the holding portion 21 of the cover 2 inserted into the engagement recessed portion 93 of the sliding plate 91 without the need for a step of moving the sliding plate 91 in attaching the cover 2 to the housing 3. Then, after the cover 2 is attached to the housing 3, the assembling jig 15 is pulled out. The temporary locking protrusion 18, the engagement recessed portion 93, and the forked portion 95 of the engagement end portion 94 are disengaged from each other. The sliding plate 91 is displaced due to the urging force of the coil spring 92. Thus, the engagement recessed portion 93 comes in contact and engagement with the holding portion 21, and is held at the aforementioned disengaged position.

As described above, according to Fourth Embodiment, the auxiliary lock assembly body 31 constituted of the auxiliary locking member 9 (the sliding plate 91 and the coil spring 92) and the closure member 11 is assembled by using the assembling jig 15. In this assembled state, the auxiliary locking member 9 is arranged in the auxiliary lock accommodating hole 3c, the cover 2 is attached to the housing 3, and then the assembling jig 15 is pulled out. This enables the auxiliary locking member 9 to be placed in the auxiliary lock accommodating hole 3c with the sliding plate 91 held on the disengaged position side. Thereby, the auxiliary locking member 9 and the cover 2 can be attached to the housing 3 without the need for such a cumbersome step as moving the sliding plate 91 to the disengaged position in attaching the cover 2 to the housing 3.

Since the auxiliary lock accommodating hole 3c is opened in the surface facing the steering column device A of the housing 3, the opening portion of the auxiliary lock accommodating hole 3c is closed by the steering column device A after the steering locking device 1 is attached to the steering column device A. Thus, the steering locking device 1 can have the excellent theft prevention without losing the assembling workability of the auxiliary locking member 9.

In this embodiment, the two pairs of, i.e., a total of four elastic arm portions 16, 17 of the assembling jig 15 are provided. However, the number of the elastic arm portions is not limited thereto. For example, a single elastic arm portion to be engaged with the forked portion 95 can be provided. Instead of providing the other one of the pair, an inflexible wall portion is provided. This configuration can provide the same effects and operations as those in this embodiment.

As described above, although the present invention has been described by way of embodiments, the present invention is by no means limited thereto, and the structure of each part can be replaced by any structure having a similar function.

The invention claimed is:

1. A steering locking device comprising:
 a locking member arranged in a housing to be slidable between a locked position and an unlocked position, the locking member at the locked position being engaged with a steering shaft to prevent rotation of the steering shaft and at the unlocked position being separated away from the steering shaft to allow the rotation of the steering shaft, the locking member including a first face parallel to an axial direction of the steering shaft, a second face perpendicular to the first face, and a protrusion protruding from the second face;
 a sliding plate held to be slidable between an engaged position and a disengaged position and urged toward the engaged position, the sliding plate at the engaged position being engaged with the protrusion of the locking member located at the locked position and at the disengaged position being separated away from the protrusion to allow sliding of the locking member;
 a holding portion arranged to be attachable to and detachable from the housing, the holding portion attached to the housing being configured to engage with the sliding plate located at the disengaged position to hold the sliding plate at the disengaged position; and
 a cover attached to the housing,
 wherein when the holding portion and the sliding plate are disengaged from each other, the sliding plate is moved from the disengaged position to the engaged position and engaged with the protrusion to prevent movement of the locking member from the locked position to the unlocked position,
 wherein the holding portion is integrally formed with the cover and protrudes inward from a back surface of the cover, and wherein the holding portion is disengaged from the sliding plate in direct response to removal of the cover from the housing in a state when the locking member is at the locked position.

2. The steering locking device according to claim 1, wherein
the locking member includes
a hanger located on a proximal end side of the locking member,
a lock main body located on a distal end side of the locking member and engageable with the steering shaft,
a coupling pin configured to couple the hanger and the lock main body, and
an urging unit provided between the hanger and the lock main body and configured to urge the lock main body from a side of the unlocked position to a side of the locked position, and
the protrusion is part of the coupling pin.

3. The steering locking device according to claim 1, wherein
the locking member includes
a hanger located on a proximal end side of the locking member,
a lock main body which is located on a distal end side of the locking member and a front end of which is fittable in the steering shaft, and
an urging unit provided between the hanger and the lock main body and configured to urge the lock main body from a side of the unlocked position to a side of the locked position,
the hanger includes an arm portion extending along the second face of the locking member, and
the arm portion includes the protrusion.

4. The steering locking device according to claim 1, wherein the sliding plate is in a flat-plate shape.

5. A steering locking device comprising:
a locking member arranged in a lock accommodating hole formed in a housing to be slidable between a locked position and an unlocked position, the locking member at the locked position being engaged with a steering shaft to prevent rotation of the steering shaft and at the unlocked position being separated away from the steering shaft to allow the rotation of the steering shaft, the locking member including a first face parallel to an axial direction of the steering shaft, a second face perpendicular to the first face, and a protrusion protruding from the second face;
a sliding plate held in an auxiliary lock accommodating hole formed in the housing to be slidable between an engaged position and a disengaged position and urged toward the engaged position, the sliding plate at the engaged position being engaged with the protrusion of the locking member located at the locked position and at the disengaged position being separated away from the protrusion of the locking member to allow sliding of the locking member;
a closure member including a jig groove formed in a direction of attaching the closure member into the auxiliary lock accommodating hole, an elastic first arm portion, and a claw formed on a front end of the first arm portion, the closure member configured to close the auxiliary lock accommodating hole with the sliding plate arranged in the auxiliary lock accommodating hole;
a holding portion arranged to be attachable to and detachable from the housing, the holding portion attached to the housing being configured to engage with the sliding plate located at the disengaged position to hold the sliding plate at the disengaged position; and
a cover attached to the housing, wherein
in a state where an assembling jig including an elastic second arm portion and a temporary locking protrusion provided on an inner surface of an end portion of the second arm portion is attached to the closure member, the second arm portion is arranged in the jig groove and the temporary locking protrusion is engaged with the sliding plate to hold the sliding plate on a side of the disengaged position on the closure member,
the sliding plate and the closure member together with the assembling jig are arrangeable in the auxiliary lock accommodating hole,
the temporary locking protrusion and the sliding plate are disengaged from each other by pulling out the assembling jig arranged in the auxiliary lock accommodating hole with the holding portion attached to the housing, and the sliding plate comes into contact and engagement with the holding portion and is held at the disengaged position in the auxiliary lock accommodating hole,
the holding portion is integrally formed with the cover and protrudes inward from a back surface of the cover, and
the holding portion disengaged from the sliding plate in direct response to removal of the cover from the housing in a state where the locking member is at the locked position.

6. A steering locking device comprising:
a locking member arranged in a housing to be slidable between a locked position and an unlocked position, the locking member at the locked position being engaged with a steering shaft to prevent rotation of the steering shaft and at the unlocked position being separated away from the steering shaft to allow the rotation of the steering shaft, the locking member including a first face parallel to an axial direction of the steering shaft, a second face perpendicular to the first face, and a protrusion protruding from the second face;
a sliding plate held to be slidable between an engaged position and a disengaged position and urged toward the engaged position, the sliding plate at the engaged position being engaged with the protrusion of the locking member located at the locked position and at the disengaged position being separated away from the protrusion to allow sliding of the locking member; and
a holding portion arranged to be attachable to and detachable from the housing, the holding portion attached to the housing being configured to engage with the sliding plate located at the disengaged position to hold the sliding plate at the disengaged position;
wherein when the holding portion and the sliding plate are disengaged from each other, the sliding plate is moved from the disengaged position to the engaged position and engaged with the protrusion to prevent movement of the locking member from the locked position to the unlocked position;
wherein the sliding plate comprises a fork-shaped engagement end portion; and
wherein the fork-shaped engagement end portion of the sliding plate at the engaged position receives the protrusion of the locking member.

* * * * *